(12) United States Patent
Sun et al.

(10) Patent No.: US 11,984,619 B2
(45) Date of Patent: May 14, 2024

(54) TAB LIMITING SHEET, TOP COVER ASSEMBLY, AND BATTERY

(71) Applicant: EVE ENERGY STORAGE CO., LTD., Hubei (CN)

(72) Inventors: Fei Sun, Hubei (CN); Xing Li, Hubei (CN); Liyuan Che, Hubei (CN)

(73) Assignee: EVE ENERGY STORAGE CO., LTD., Wuhan (CN)

( * ) Notice: Subject to any disclaimer, the term of this patent is extended or adjusted under 35 U.S.C. 154(b) by 0 days.

(21) Appl. No.: 18/358,069

(22) Filed: Jul. 25, 2023

(65) Prior Publication Data

US 2024/0120620 A1    Apr. 11, 2024

(30) Foreign Application Priority Data

Oct. 8, 2022  (CN) .......................... 202211219426.7

(51) Int. Cl.
*H01M 50/477*  (2021.01)
*H01M 50/15*   (2021.01)
*H01M 50/474*  (2021.01)
*H01M 50/55*   (2021.01)

(52) U.S. Cl.
CPC ......... *H01M 50/477* (2021.01); *H01M 50/15* (2021.01); *H01M 50/474* (2021.01); *H01M 50/55* (2021.01)

(58) Field of Classification Search
CPC .. H01M 50/477; H01M 50/474; H01M 50/55; H01M 50/15
See application file for complete search history.

(56) References Cited

U.S. PATENT DOCUMENTS

| 10,818,886 | B1 | 10/2020 | Chen |
| 11,449,792 | B2 | 6/2022 | Neumann |
| 2020/0365838 | A1 | 11/2020 | Chen |

(Continued)

FOREIGN PATENT DOCUMENTS

| CN | 206379415 U | 8/2017 |
| CN | 206432317 U | 8/2017 |
| CN | 209626264 U | 11/2019 |

(Continued)

OTHER PUBLICATIONS

Notice of Allowance issued in corresponding Chinese Patent Application No. 202211219426.7 dated Nov. 16, 2022, pp. 1-6.

*Primary Examiner* — Jane J Rhee
(74) *Attorney, Agent, or Firm* — Nathan & Associates; Menachem Nathan

(57) ABSTRACT

A tab limiting sheet, a top cover assembly, and a battery are provided. The battery is insulated and disposed between a cell body and two tab bodies. The tab limiting sheet includes a first mounting part, a connecting assembly, and a second mounting part. The connecting assembly includes an elastic element and a first support element. Both ends of the elastic element are respectively connected with the first mounting part and the second mounting part. The first support element includes a first supporting part connected with the first mounting part and a second part connected with the second mounting part. When the elastic element is in a natural state, the first supporting part and the second supporting part are spaced in the first direction. When the elastic element is squeezed to a maximum deformation state, the first supporting part is tightly abutted against the second supporting part.

20 Claims, 5 Drawing Sheets

(56) References Cited

U.S. PATENT DOCUMENTS

2021/0242549 A1  8/2021  Zheng et al.

FOREIGN PATENT DOCUMENTS

| CN | 111785901 | A | 10/2020 |
|----|-----------|---|---------|
| CN | 114497920 | A | 5/2022 |
| CN | 216720249 | A | 6/2022 |
| CN | 217361843 | U | 9/2022 |
| CN | 217426922 | U | 9/2022 |
| CN | 217507558 | U | 9/2022 |
| JP | 2013191422 | A | 9/2013 |
| JP | 2019182066 | A | 10/2019 |

TAB LIMITING SHEET, TOP COVER ASSEMBLY, AND BATTERY

CROSS-REFERENCE TO RELATED APPLICATIONS

This application claims priority to Chinese Patent Application Serial No. CN 202211219426.7, filed on Oct. 8, 2022, which is herein incorporated by reference in its entirety.

TECHNICAL FIELD

The present application relates to the field of lithium battery technologies, for example, to a tab limiting sheet, a top cover assembly, and a battery.

BACKGROUND

In related art, restricted by machining technologies, tabs need to meet certain lengths in a process of manufacturing a secondary battery. The tabs with longer lengths will be folded into a certain space by a tab folding process. When the secondary battery packaged is used, it may be possibly bumped and impacted duo to a usage environment, resulting in an extrusion deformation of some tabs and breaking away from original positions. The tabs are reversely inserted into a battery cell to contact with pole pieces with opposite polarities, resulting in an internal short circuit. After the internal short circuit occurs, the battery is easy to smoke, catch fire, and even explode, resulting in a safety problem.

SUMMARY

A purpose of the present application is to prevent a contact between a positive pole tab and a negative pole tab of a battery cell, and prevent the positive pole tab and the negative pole tab from being reversely inserted into the battery cell.

Another purpose of the present application is to provide a top cover assembly stably and electrically connected with the battery cell, so as to prevent the contact between the positive pole tab and the negative pole tab of the battery cell.

Another purpose of the present application is to provide a battery having good quality and a high safety factor.

In order to achieve above purposes, the present application adopts following technical solutions:

First aspect, a tab limiting sheet is provided to be configured to be insulated and disposed between a cell body and two tab bodies of a battery cell, wherein the two tab bodies are arranged at intervals along a first direction, and the tab limiting sheet further includes:
- a first mounting part and a second mounting part respectively configured to abut against the two tab bodies; and
- a connecting assembly, wherein the first mounting part, the connecting assembly, and the second mounting part are sequentially connected along the first direction, and the connecting assembly includes:
  - an elastic element, wherein both ends of the elastic element are respectively connected with the first mounting part and the second mounting part; and
  - a first support element including a first supporting part connected with the first mounting part and a second part connected with the second mounting part;
  - wherein when the elastic element is in a natural state, the first supporting part and the second supporting part are spaced in the first direction, and when the elastic element is squeezed to a maximum deformation state, the first supporting part is tightly abutted against the second supporting part.

Beneficial effects of the present application are that: when the battery cell is deformed and the two tab bodies are close to each other, the two tab bodies will squeeze the first mounting part and the second mounting part. An acting force received by the first mounting part and the second mounting part is transmitted to the elastic element. The elastic element produces a corresponding deformation under pressure to absorb part of a deformation caused by a position movement of the two tab bodies. When the battery cell is continuously deformed and the two tab bodies are continuously close to each other, the first supporting part and the second supporting part are also close to each other. When a distance between the two tab bodies is close to a safe distance, the first supporting part is tightly abutted against the second supporting part to limit the two tab bodies to be further close to each other, thereby preventing the short circuit inside the battery caused by the contact between the two tab bodies. An arrangement of the tab limiting sheet not only prevents the two tab bodies from being contacted, but also prevents a single tab body from being inversely inserted into the cell body.

BRIEF DESCRIPTION OF THE DRAWINGS

The present application will now be described in further detail with reference to accompanying drawings and embodiments.

REFERENCE NUMERALS

Figure 1:
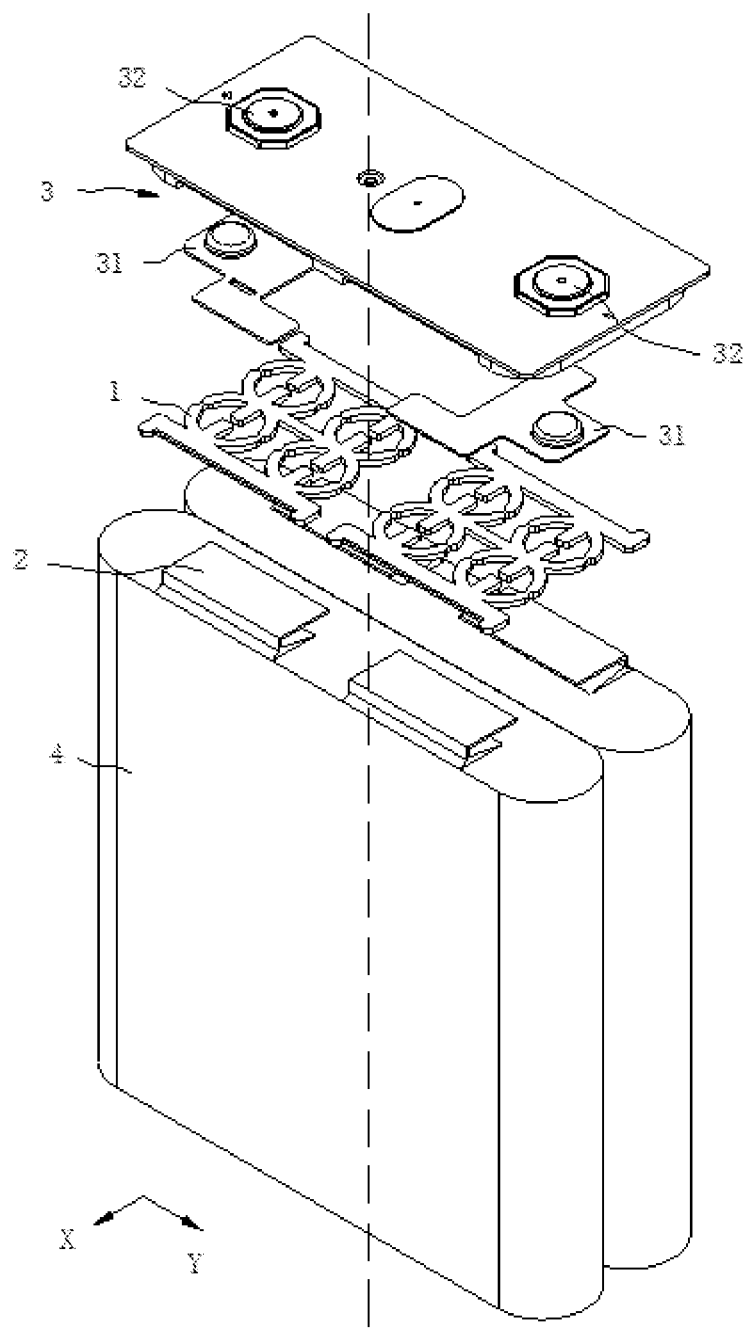
FIG. 1 is an exploded schematic diagram of a battery provided by some embodiments of the present application.

100, limiting group; 1, tab limiting sheet; 11, first mounting part; 111, first side surface; 112, first mounting groove; 12, connecting assembly; 121, elastic element; 1211, first arm body; 1212, second arm body; 1213, elastic element; 122, first support element; 1221, first supporting part; 1222, second supporting part; 13, second support element; 131, third supporting part; 132, fourth supporting part; 14, first reinforcing arm; 15, second reinforcing arm; 16, second mounting part; 161, second side surface; 162, second mounting groove; 2, tab body; 21, first connecting part; 22, bending part; 23, second connecting part; 3, top cover assembly; 31, connecting sheet; 32, pole post; 4, cell body.

DETAILED DESCRIPTION OF THE EMBODIMENT

In order to make a technical problem solved, technical solutions adopted, and technical effects achieved by the present application clearer, the technical solutions of embodiments of the present application will be further described in detail with reference to accompanying drawings. Apparently, the described embodiments are merely a part of the embodiments of the present application, not all the embodiments. All other embodiments obtained by a person of ordinary skill in the art based on the embodiments of the present application belong to a protecting scope of the present application.

In the description of the present application, unless otherwise specified and limited, the terms "link", "connect", or "fix" are to be construed in a broad sense. For example, as fixedly connected, detachably connected, or integrated; mechanically connected or electrically connected; directly connected with each other or indirectly connected with each other via an intermediary; or internally connected between two elements or interacted between two elements. Meanings of the preceding terms in the present application may be understood according to situations by an ordinary person in the art.

As shown in FIG. 1 to FIG. 3, and FIG. 6, a tab limiting sheet 1 provided by the present application is configured to be insulated and disposed between a cell body 4 and two tab bodies 2 of a battery cell. The two tab bodies 2 are disposed on the battery cell. One of the two tab bodies 2 is connected with a positive pole of the cell body 4, and another one of the two tab bodies 2 is connected with a negative pole of the cell body 4. The two tab bodies 2 on the battery cell are arranged at intervals along a first direction. The first direction is an X-direction shown in the figures. The tab limiting sheet 1 includes a first mounting part 11, a connecting assembly 12, and a second mounting part 16, which are sequentially connected along the first direction. The first mounting part 11 and the second mounting part 12 are respectively configured to abut against the two tab bodies 2 tightly. The connecting assembly 12 includes an elastic element 121 and a first support element 122. Both ends of the elastic element 121 are respectively connected with the first mounting part 11 and the second mounting part 16. The first support element 122 includes a first supporting part 1221 and a second part 1222, which are independent of each other. The first supporting part 1221 is connected with the first mounting part 11, and the second supporting part 1222 is connected with the second mounting part 16. When the elastic element 121 is in a natural state, the first supporting part 1221 and the second supporting part 1222 are spaced in the first direction. When the elastic element 121 is squeezed to a maximum deformation state, the first supporting part 1221 is tightly abutted against the second supporting part 1222. When the battery cell is deformed and the two tab bodies 2 are close to each other, the two tab bodies 2 will squeeze the first mounting part 11 and the second mounting part 16. An acting force received by the first mounting part 11 and the second mounting part 16 is transmitted to the elastic element 121. The elastic element 121 produces a corresponding deformation under pressure to absorb part of a deformation caused by a position movement of the two tab bodies 2. When the battery cell is continuously deformed and the two tab bodies 2 are continuously close to each other, the first supporting part 1221 and the second supporting part 1222 are also close to each other. When a distance between the two tab bodies 2 is close to a safe distance, the first supporting part 1221 is tightly abutted against the second supporting part 1222 to limit the two tab bodies 2 to be further close to each other, thereby preventing a short circuit inside the battery caused by a contact between the two tab bodies 2.

Figure 6:
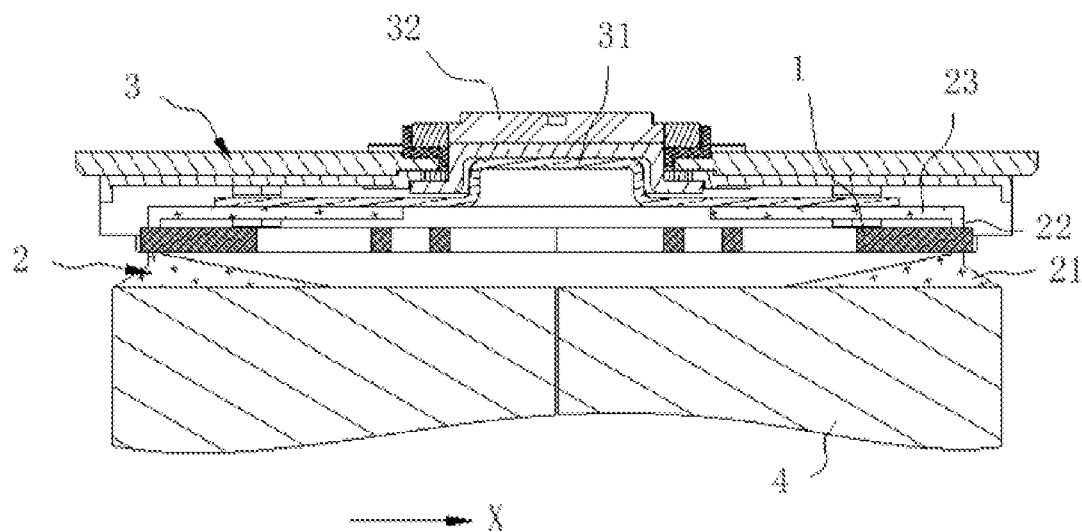
FIG. 6 is a partial sectional schematic diagram of the battery provided by the embodiments of the present application.

Referring to FIG. 6, in this embodiment, the tab body 2 includes a first connecting part 21, a bending part 22, and a second connecting part 23, which are connected at an included angle sequentially. The first connecting part 21 is connected with the cell body 4. A spacing area is provided between the second connecting part 23 and the cell body 4. The tab limiting sheet 1 is disposed in the spacing area. The first mounting part 11 and the second mounting part 16 of the tab limiting sheet 1 are respectively opposite to the bending parts 22 of the two tab bodies 2. An arrangement of the tab limiting sheet 1 not only prevents the two second connecting parts 23 of the two tab bodies 2 from contacting, but also prevents the first connecting part 21, the bending part 22, and the second connecting part 23 of the tab body 2 from being reversely inserted into the cell body 4. Certainly, the tab limiting sheet 1 is made of an insulating material. A length of the tab body 2 is related to a size (especially a thickness) of the cell body 4. In this embodiment, the length of the tab body 2 ranges from 15 mm to 45 mm. A length of the second connecting part 23 does not exceed ½ of the thickness of the cell body 4.

Referring to FIG. 2 to FIG. 5, specifically, the connecting assembly 12 includes two elastic elements 121. The first support element 122 is located between two adjacent elastic elements 12. By disposing the first support element 122 located between the two adjacent elastic elements 121, a force of the tab limiting sheet 1 may be balanced to prevent the elastic elements 121 from being concentrated on one side of the tab limiting sheet 1, which ensures that when the first supporting part 1221 and the second supporting part 1222 are tightly abutted, the elastic elements 121 may not be further deformed, thereby preventing a contract between the two tab bodies 2.

Furthermore, the elastic element 121 includes a first arm body 1211, an elastic part 1213, and a second arm body 1212. An end of the first arm body 1211 is connected with an end of the second arm body 1212 through the elastic part 1213. The first arm body 1211 is located at a side of the elastic part 1213 adjacent to the first mounting part 11. By disposing the first arm body 1211, the elastic part 1213, and the second arm body 1212, the deformation and an elasticity of the elastic element 121 may be controlled by adjusting a shape and a type of the elastic element 121, so that the first mounting part 11 and the second mounting part 16 may provide an appropriate acting force for the two tab bodies 2 of the battery cell, thereby preventing the contract between the two tab bodies 2, and further preventing the tab bodies 2 from being torn and broken.

Figure 3:
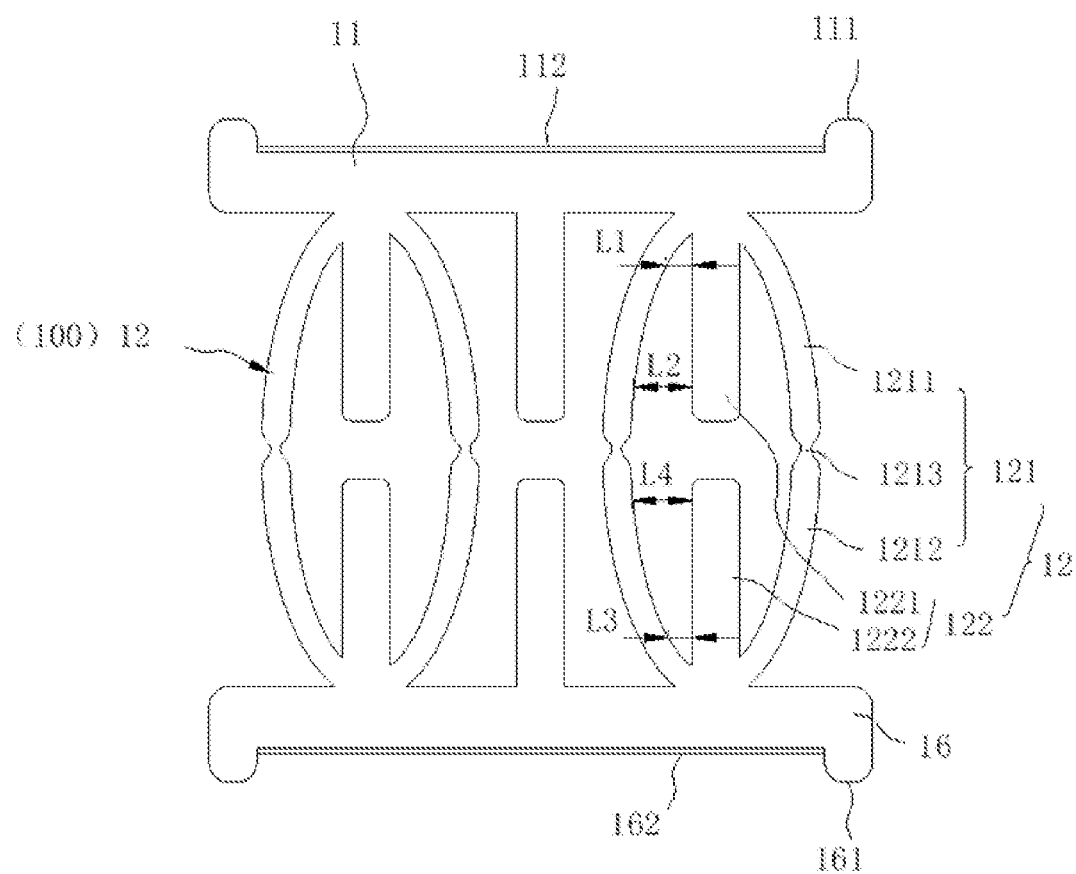
FIG. 3 is a main view schematic diagram of the tab limiting sheet in FIG. 2.

Referring to FIG. 3, in this embodiment, the first arm body 1211 and the second arm body 1212 form an included angle. A distance from an end of the first arm body 1211 adjacent to the first mounting part 11 to the first supporting part 122 is L1, a distance from an end of the first arm body 1211 away from the first mounting part 11 to the first supporting part 122 is L2, and L2>L1. A distance from an end of the second arm body 1212 adjacent to the second mounting part 16 to the first supporting part 122 is L3, a distance from an end of the second arm body 1212 away from the second mounting part 16 to the first supporting part 122 is L4, and L4>L3. At the same time, both the first arm body 1211 and the second arm body 1212 extend towards a direction away from the first supporting element 122. When the elastic element 121 is squeezed, the elastic part 1213 may be bent and extended outwards. At the same time, a movement of the elastic part 1213 may not result in positional interference between the first supporting part 1221 and the second supporting part 1222, which ensures that the first supporting part 1221 and the second supporting part 1222 may be tightly abutted. When the elastic part 1213 is bent and extended outwards, there is a resilient force which may reversely support the tab bodies 2, so that the tab bodies 2 are tensioned, and redundant parts of the tab bodies 2 are prevented from contacting with the cell body 4 of the battery cell to cause the short circuit of the battery.

In this embodiment, ends of the first arm bodies 1211 of the two elastic elements 121 adjacent to the first mounting part 11 are connected with an end of the first supporting part 1221 to form a first common end. The first common end is connected with the first mounting part 11. Ends of the second arm bodies 1212 of two elastic elements 121 adjacent to the second mounting part 16 are connected with an end of the second supporting part 1222 to form a second common end connected with the second mounting part 16. By disposing the first common end and the second common end, the ends of the two elastic elements 121 and the ends of the first supporting element 122 are connected. When the elastic elements 121 or the first support member 122 is squeezed, the first common end and the second common end may disperse a force of end areas of the elastic elements 121 and the first support element 122, and maintain a connection strength between the elastic elements 121 and the first support element 122 and the first mounting part 11 and the second mounting part 16, thereby preventing the ends of the elastic elements 121 and the ends of the first support element 122 from being broken.

Specifically, a cross-sectional size of the elastic part 1213 is less than both a cross-sectional size of the first arm body 1211 and a cross-sectional size of the second arm body 1212. In this embodiment, the tab limiting sheet 1 is integrally formed. That is, a material of the elastic part 1213, a material of the first arm body 1211, and a material of the second arm body 1212 are same. Therefore, a deformability of the elastic part 1213 may be increased by decreasing the cross-sectional size of the elastic part 1213 to reduce a strength of the elastic part 1213, so that the elastic element 121 may absorb a part of the deformation of the tab bodies 2. Certainly, in other embodiments, the tab limiting sheet 1 may be formed by splicing. In this case, a shape of the elastic part 1213 is not limited to shapes provided by the embodiment. The elastic part 1213 may be independently made of a material with good elastic performance.

Figure 2:
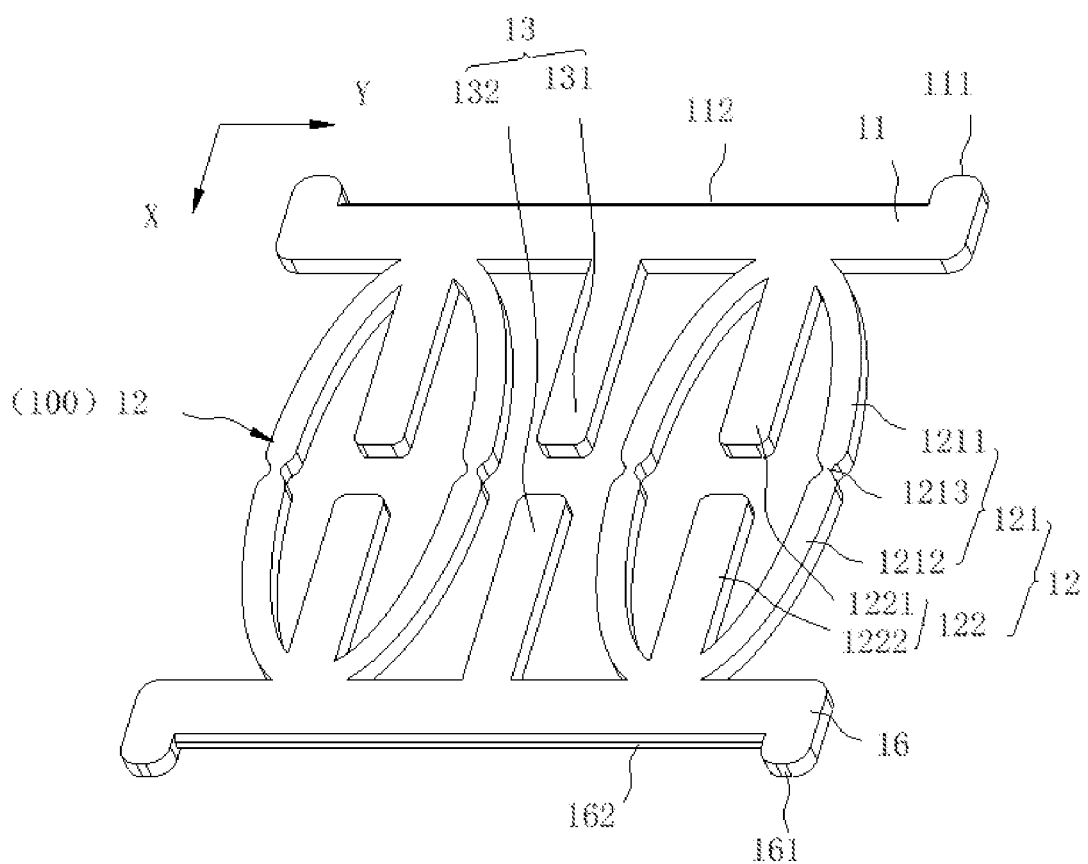
FIG. 2 is a schematic diagram of a tab limiting sheet provided by some embodiments of the present application.
Figure 4:
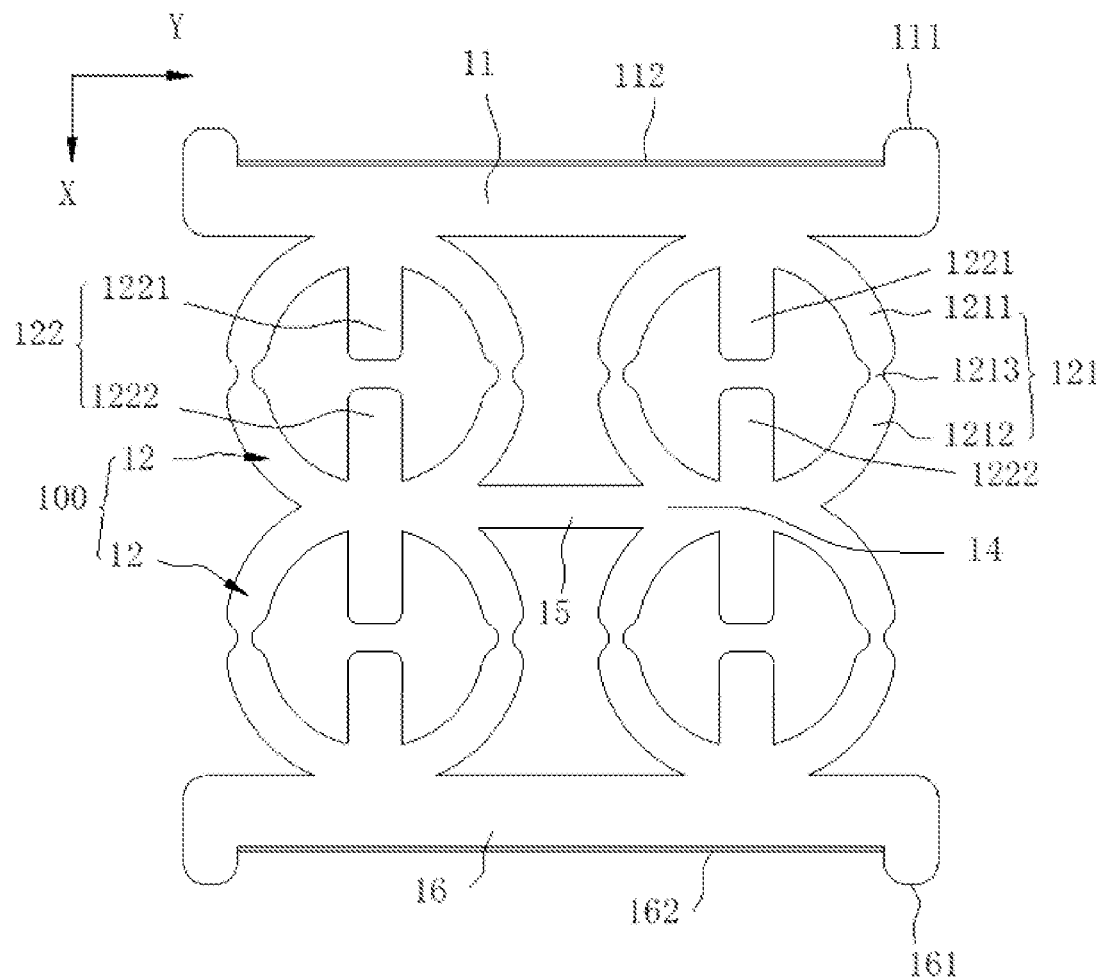
FIG. 4 is a main view schematic diagram of a tab limiting sheet provided by another embodiment of the present application.
Figure 5:
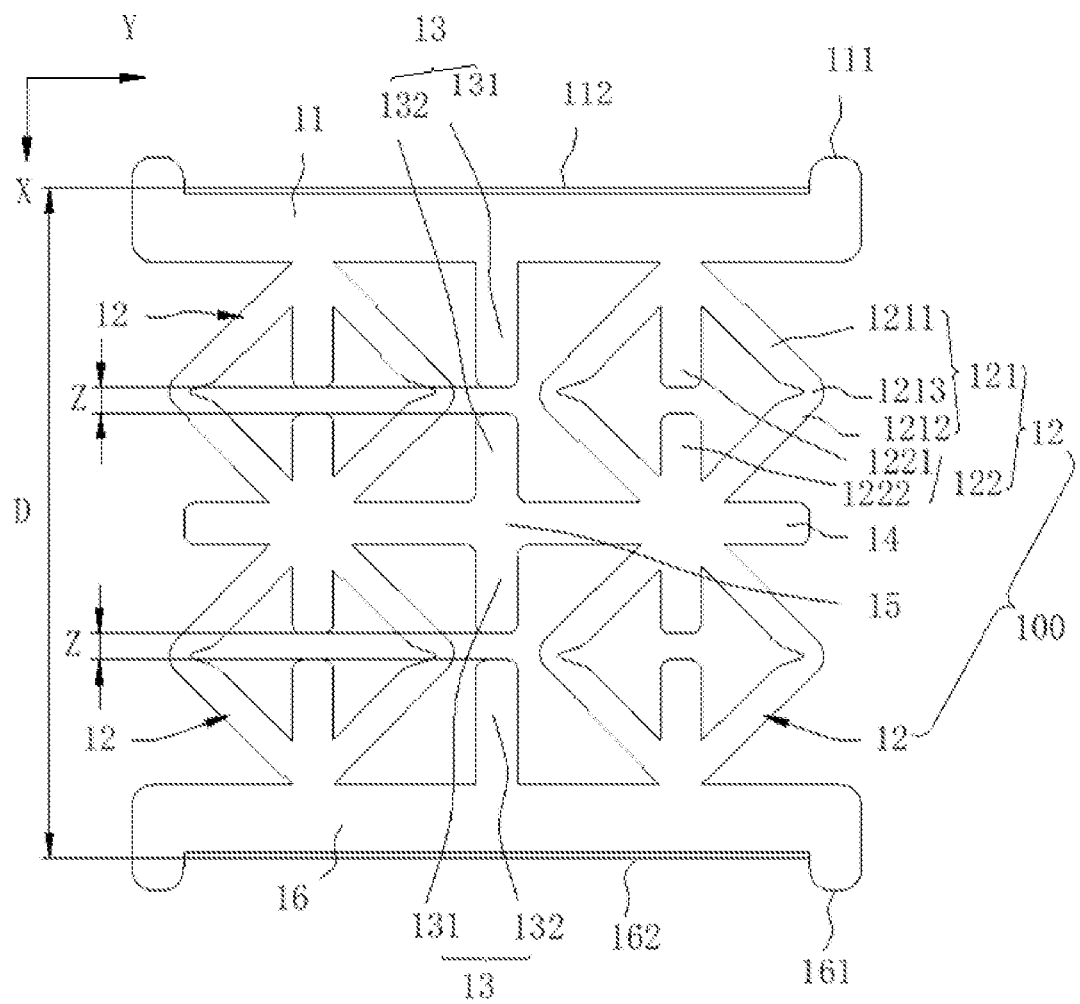
FIG. 5 is a main view schematic diagram of a tab limiting sheet provided by another embodiment of the present application.

Referring to FIG. 2 to FIG. 4, in one embodiment, the first arm body 1211 and the second arm body 1212 are in an arc shape, and the two elastic elements 121 in the connecting assembly 12 are combined to form a circle shape or an ellipse shape. Referring to FIG. 5, in another embodiment, the first arm body 1211 and the second arm body 1212 are in a straight-line shape, and the two elastic elements 121 in the connecting assembly 12 are combined to form a diamond shape. Certainly, the first arm body 1211 and the second arm body 1212 may also be in a wavy shape or other irregular patterns, and a pattern formed by a combination of the two elastic elements 121 in the connecting assembly 12 further correspondingly changes. The shapes of the first arm body 1211 and the second arm body 1212 may affect an elasticity of the first arm body 1211 and the second arm body 1212. For example, the elasticity of the first arm body 1211 and second arm body 1212 in the arc shape is greater than the elasticity of the first arm body 1211 and second arm body 1212 in the straight-line shape. Therefore, the shapes of the first arm body 1211 and the second arm body 1212 may be designed according to actual needs. Since the first arm body 1211 and the second arm body 1212 have the elasticity, when the tab bodies 2 squeeze the tab limiting sheet 1, the first arm body 1211 and the second arm body 1212 have a resilience force to support the tab bodies 2, so that the tab bodies 2 are tensioned, thereby preventing the second connecting parts 23 of the tab bodies 2 from being reversely inserted into the cell body 4 to cause the short circuit of the battery.

The shape of the first arm body 1211 and the shape of the second arm body 1212 may be same, and the size of the first arm body 1211 and the size of the second arm body 1212 may further be same, which ensures that a deformation of the first arm body 1211 and a deformation of the second arm body 1212 are same, thereby preventing the tab limiting sheet 1 from being bent due to an overlarge local deformation.

Specifically, the tab limiting sheet 1 includes at least one limiting group 100. The limiting group 100 includes at least one connecting assembly 12 arranged in the first direction. The limiting group 100 in FIG. 4 and FIG. 5 includes two connecting assemblies 12. The limiting group 100 in FIG. 3 includes one connection assembly 12. Two adjacent connecting assemblies 12 in the same limiting group 100 are connected through a first reinforcing arm 14. At least one limiting group 100 is provided. FIG. 2 to FIG. 5 are both provided with two limiting groups 100. All the limiting groups 100 are arranged at intervals along a second direction. The second direction is perpendicular to the first direction, and the second direction is a width direction of the tab bodies 2. By disposing the limiting groups 100 arranged at intervals along the second direction, there are a plurality of dispersed force points between the connecting assemblies 12 and the first mounting part 11 and between the connection assemblies 12 and the second mounting part 16, so that the tab limiting sheet 1 may uniformly support the tab bodies 2, and a possibility that the tab bodes 2 is torn is reduced. When a size of the battery is larger, a quantity of connection assemblies 12 in each of the limit groups 100 may be increased. In this embodiment, a size of the first reinforcing arm 14 may be adjusted according to actual needs. Referring to FIG. 5, in this embodiment, the quantity of the connecting assemblies 12 in each of the limiting groups 100 is N. A distance between the first supporting part 1221 and the second supporting part 1222 is Z. A maximum deformation of the tab limiting sheet 1 is N*Z. Wherein the N*Z ranges from 2 mm to 10 mm. A value of the N*Z is less than 2 mm, so that the tab bodies 2 are propped out to contact with an aluminum shell to cause the short circuit. The value of the N*Z is greater than 10 mm, so that a probability that the second connecting part 23 of the tab bodies 2 is inversely inserted into the cell body 4 is improved.

Specifically, the tab limiting sheet 1 includes a second reinforcing arm 15, The first reinforcing arms 14 in two adjacent limiting groups 100 are connected through the second reinforcing arm 15. By disposing the second reinforcing arm 15, the connecting assemblies 12 in the two adjacent limiting groups 100 may be connected, so that a strength of the tab limiting sheet 1 may be ensured, a force of the connecting assemblies 12 is balanced, and the tab limiting sheet 1 is prevented from being bent due to an overlarge deformation of the single connecting assembly 12.

Referring to FIG. 5, in one embodiment, a second support element 13 is further disposed between the two adjacent limiting groups 100. The second support element 13 includes a third supporting part 131 and a fourth supporting part 132, which are independent with each other. The third supporting part 131 is connected with the first mounting part 11, and the fourth supporting part 132 is connected with the second mounting part 16. When the elastic element 121 is in the natural state, the third supporting part 131 and the fourth supporting part 141 are spaced in the first direction. When the elastic element 121 is squeezed to the maximum deformation state, the third supporting part 131 is tightly abutted against the fourth supporting part 141. At the same time, one first support element 122 or one second support element 13 is disposed between the adjacent two elastic elements 121. When the elastic element 121 is squeezed to the maximum deformation state, the third supporting part 131 and the fourth supporting part 141 are tightly abutted, and the third supporting part 131 and the fourth supporting part 132 are tightly abutted. Therefore, both sides of the elastic element 121 have a supporting force, so that the two sides of the elastic element 121 are balanced in force, thereby preventing the elastic element 121 from being continuously deformed after being pressed. In this embodiment, in the natural state, the distance between the first supporting part 1221 and the second supporting part 1222 is Z, and a distance between the third supporting part 131 and the fourth supporting part 132 is also Z.

Continue to refer to FIG. 5, the quantity of the connecting assemblies 12 in each of the limiting groups 100 is N, and N≥2. The first reinforcing arms 14 in the two adjacent limiting groups are connected through a second reinforcing arm 15. A quantity of second support elements 13 are disposed along the first direction. Along the first direction, the second reinforcing arm 15 is connected with the third supporting part 131 and the fourth supporting part 132 on two adjacent second supporting parts 13. By disposing the third supporting part 131 and the fourth supporting part 132 on the second reinforcing arm 15, a structure of the tab limiting sheet 1 may be simplified, a manufacturing difficulty of the tab limiting sheet 1 may be decreased, and a strength of the third supporting part 131 and the fourth supporting part 132 may further be ensured, thereby the second supporting part 13 may provide a strength support for the tab bodies 2.

Referring to FIG. 2 to FIG. 5, furthermore, the first mounting part 11 is provided with a first side surface 111 away from the second mounting part 16. The first side surface 111 is recessed to define a first mounting groove 112 configured to mount the tab bodies 2. The second mounting part 16 is provided with a second side surface 161 away from the first mounting part 11. The second side surface 161 is recessed to define a second mounting groove 162 configured to mount the tab bodies 2. By providing the first mounting groove 112 and the second mounting groove 162, the two tab bodies 2 may be respectively mounted in the first mounting groove 112 and the second mounting groove 162. Groove walls of the first mounting groove 112 and the second mounting groove 162 may limit the tab bodies 2, so as to prevent the tab bodies 2 from being separated from the tab limiting sheet 1.

In this embodiment, the tab body 2 has a plurality of layers. The quantity of the layers of the tab body 2 ranges from 20 to 50. The multi-layer tab body 2 has a certain thickness, so that the groove walls of the first mounting groove 112 and the second mounting groove 162 may respectively limit and clamp the tab bodies 2, thereby preventing the tab limiting sheet 1 from sliding left and right in a process of assembling the battery.

In one embodiment, a transition arc surface is provided between the groove wall of the first mounting groove 112 and the first side surface 111, and a transition arc surface is further provided between the groove wall of the second mounting groove 162 and the second side surface 161, which may prevent a sharp angle structure from scratching the tab bodies 2.

Specifically, the bending parts 22 of the two tab bodies 2 are respectively attached to bottoms of the first mounting groove 112 and the second mounting groove 162. The second connecting parts 23 of the two tab bodies 2 are respectively located on upper surfaces of the first mounting part 11 and the second mounting part 16. When the battery is assembled, for example, when the cell is folded, the two tab bodies 2 may move inwards and compress the first mounting part 11 and the second mounting part 16 to exert inward forces on the mounting parts. Meanwhile, the forces exerted on the first mounting part 11 and the second mounting part 16 are respectively transmitted to the first arm body 1211 and the second arm body 1212. When the first arm body 1211 and the second arm body 1212 are subjected to compressive forces, the elastic part 1213 will be bent and extended outwards, and the elastic part 1213 generates a corresponding elastic deformation for cushioning the forces, so that the first arm body 1211 and the second arm body 1212 will not be broken due to the excessive forces.

While the elastic part 1213 is bent outward, the first supporting part 1221 and the second supporting part 1222 (the third supporting part 131 and the fourth supporting part 132) gradually approach each other. When the first supporting part 1221 and the second supporting part 1222 (the third supporting part 131 and the fourth supporting part 132) are in contact, the tab bodies 2 on both sides of the tab limiting sheet 1 stop getting close inwards. There is no gap between the first supporting part 1221 and the second supporting part 1222 (the third supporting part 131 and the fourth supporting part 132), the first mounting portion 11 and the second mounting portion 16 are reversely acted on the tab bodies 2 by the compression force of the tab bodies 2 to support the tab bodies 2.

The first mounting part 11, the second mounting part 16, the first arm body 1211, the elastic part 1213, the second arm body 1212, the first supporting part 1221, the second supporting part 1222 and the like enable the tab limiting sheet 1 to be hollowed out. In this way, material cost may be reduced, and a self-weight of the tab limiting sheet 1 is reduced. Under a condition that a weight of the secondary battery is constant, a weight of an active material on the tab bodies 2 is increased by reducing the weight of the tab limiting sheet 1, thereby increasing an energy density of the battery.

In this embodiment, a distance from the bottom of the first mounting groove 112 to the bottom of the second mounting groove 162 is D, a distance between the two tab bodies 2 is X1, and a thickness of the cell body 4 is X2, wherein X1<D<X2. If D>X2, the tab bodies 2 are propped out to contact with an aluminum shell, resulting in the short circuit. If D<X2, the supporting force of the tab bodies 2 is insufficient, so that the tab bodies 2 may not be completely flattened, and a risk that the tab bodies 2 are reversely inserted is not reduced.

The embodiments further provide a top cover assembly 3. As shown in FIG. 6, the top cover assembly 3 includes a top cover, a pole post 32, and the tab limiting sheet 1 in any embodiment mentioned above. The pole post 32 is disposed on the top cover and connected with the tab bodies 2 of the battery cell. The arrangement of the tab limiting sheet 1 may prevent the contract between the second connecting parts 23 of the two tab bodies 2, and may prevent the first connecting part 21, the bending part 22, and the second connecting part 23 of the tab bodies 2 from being inversely inserted into the cell body 4. Therefore, the arrangement of the tab limiting sheet 1 may ensure a connection stability of the second connecting part 23 and the pole post 32, and may prevent the short circuit between the positive pole and the negative pole of the battery cell caused to the short circuit of the battery.

In one embodiment, the top cover assembly 3 further includes a connecting sheet 31. The second connecting part 23 of the tab bodies 2 is connected with the pole column 32 through the connecting sheet 31, so that the length of the second connecting part 23 may be shortened, a possibility that the two second connecting parts 23 are contacted is reduced, and the probability that the second connecting part 23 is inversely inserted into the cell body 4 is further reduced.

In other embodiments, the top cover assembly 3 may not be provided with the connecting sheet 31. At this time, the tab bodies 2 are directly connected to the pole column 32. Since no connecting sheet 31 is provided, the tab body 2 with longer length are required to meet a connection condition. Illustratively, the length of the tab body 2 ranges from 20 mm to 50 mm. Since the length of the tab body 2 in the battery without the connecting sheet 31 is longer, the tab bodies 2 are easier to be reversely inserted into the cell body 4 due to external influence. Therefore, a probability that the tab bodies 2 are reversely inserted into the cell body 4 may be greatly reduced due to the arrangement of the tab limiting sheet 1, thereby preventing the internal short circuit of the battery. Certainly, no matter whether the top cover assembly 3 includes the connecting sheet 31 or not, the tab limiting sheet 1 may be arranged to limit and fix the tab bodies 2.

The embodiments further provide a battery. As shown in FIG. 1 and FIG. 6, the battery includes a battery cell and the top cover assembly 3 in the embodiments mentioned above. The battery cell includes a cell body 4 and the two tab bodies 2. A first connecting part 21 of the tab bodies 2 is connected to the cell body 4. The spacing area is formed between the second connecting part 23 and the cell body 4. The tab limiting sheet 1 of the top cover assembly 3 is arranged in the spacing area. The first mounting part 11 and the second mounting part 16 of the tab limiting sheet 1 are respectively opposite to the bending parts 22 of the two tab bodies 2. The arrangement of the tab limiting sheet 1 may ensure that the two tab bodies 2 are spaced, and may further ensure that the second connecting part 23 of the tab bodies 2 and the cell body 4 are spaced. Therefore, a probability of the short circuit in the battery provided with the tab limiting sheet 1 is low. Even if the battery cell is expanded, bumped and the like, the tab body 2 of the positive pole may not be connected with the tab body 2 of the negative pole to cause the short circuit, thereby improving a safety coefficient of the battery.

In description of the embodiment, it should be understood that orientational or positional relationships represented by directional terms mentioned in the present application, such as up, down, left, right, etc., are orientational or positional relationships based on the drawings, and are merely for the convenience of describing the present application and simplifying the description, rather than indicating or implying that the device or element is intended to have a particular orientation, or is constructed and operated in a particular orientation, and therefore, should not be interpreted as a limitation of the present application. In addition, the terms "first" and "second" are only used to distinguish between the descriptions, and have no special meaning.

In the description of this specification, descriptions of the reference terms "an embodiment", "example", etc. mean that specific features, structures, materials, or features described in connection with the embodiments or examples are included in at least one embodiment or example of the present application. In this specification, schematic expressions of the above terms do not necessarily refer to the same embodiments or examples.

In addition, it should be understood that although the specification is described in accordance with embodiments, not each embodiment contains only an independent technical solution, the description is set forth in such a manner as to be clear only, and the specification should be taken as a whole by those skilled in the art, and the technical solutions in the various embodiments may be suitably combined to form other embodiments that will be understood by those skilled in the art.

The technical principles of the present application are described above in connection with specific embodiments. These descriptions are intended merely to explain the principles of the present application and cannot be construed in any way as limiting the scope of protection of the present application. Based on the explanation herein, those skilled in the art may not require creative efforts to associate other embodiments of the present application which would fall within the scope of the present application.

What is claimed is:

1. A tab limiting sheet, configured to be insulated and disposed between a cell body and two tab bodies of a battery cell, wherein the two tab bodies are arranged at intervals along a first direction, and the tab limiting sheet further comprises:
   a first mounting part and a second mounting part respectively configured to abut against the two tab bodies tightly; and
   a connecting assembly, wherein the first mounting part, the connecting assembly, and the second mounting part are sequentially connected along the first direction, and the connecting assembly comprises:
      an elastic element, wherein both ends of the elastic element are respectively connected with the first mounting part and the second mounting part; and
      a first support element comprising a first supporting part connected with the first mounting part and a second part connected with the second mounting part;
      wherein when the elastic element is in a natural state, the first supporting part and the second supporting part are spaced in the first direction, and when the elastic element is squeezed to a maximum deformation state, the first supporting part is tightly abutted against the second supporting part.

2. The tab limiting sheet of claim 1, wherein the connecting assembly comprises two elastic elements, and the first supporting part is located between the two elastic elements.

3. The tab limiting sheet of claim 2, wherein ends of the two elastic elements adjacent to the first mounting part are connected with an end of the first supporting part to form a first common end, and the first common end is connected with the first mounting part; and
   ends of the two elastic elements adjacent to the second mounting part are connected with an end of the second supporting part to form a second common end, and the second common end is connected with the second mounting part.

4. The tab limiting sheet of claim 1, wherein the elastic element comprises a first arm body, an elastic part, and a second arm body, an end of the first arm body adjacent to the second arm body is connected with an end of the second arm body adjacent to the first arm body through the elastic part, an end of the first arm body away from the second arm body is connected with the first mounting part, and an end of the second arm body away from the first arm body is connected with the second mounting part.

5. The tab limiting sheet of claim 4, wherein a distance from an end of the first arm body adjacent to the first mounting part to the first supporting part is L1, a distance from an end of the first arm body away from the first mounting part to the first supporting part is L2, and L2>L1; and/or
a distance from an end of the second arm body adjacent to the second mounting part to the first supporting part is L3, a distance from an end of the second arm body away from the second mounting part to the first supporting part is L4, and L4>L3.

6. The tab limiting sheet of claim 5, wherein a cross-sectional size of the elastic part is less than both a cross-sectional size of the first arm body and a cross-sectional size of the second arm body.

7. The tab limiting sheet of claim 4, wherein the first arm body is in an arc shape, a straight-line shape, or a wave shape; and/or, the second arm body is in an arc shape, a straight-line shape, or a wave shape.

8. The tab limiting sheet of claim 1, further comprising at least one limiting group, wherein the limiting group comprises at least one connecting assembly arranged along the first direction, two adjacent connecting assemblies in one same limiting group are connected through a first reinforcing arm, the limiting groups are spaced along a second direction, and the second direction and the first direction form an included angle.

9. The tab limiting sheet of claim 8, further comprising a second reinforcing arm, wherein the first reinforcing arms in two adjacent limiting groups are connected through the second reinforcing arm.

10. The tab limiting sheet of claim 8, wherein a second support element is disposed between two adjacent limiting groups, the second support element comprises a third supporting part connected with the first mounting part and a fourth supporting part connected with the second mounting part; when the elastic element is in the natural state, the third supporting part and the fourth supporting part are spaced in the first direction; and when the elastic element is squeezed to the maximum deformation state, the third supporting part is tightly abutted against the fourth supporting part.

11. The tab limiting sheet of claim 10, wherein a quantity of the connecting assemblies in each of the limiting groups is N, and N≥2; the first reinforcing arms in the two adjacent limiting groups are connected through a second reinforcing arm, and a quantity of second support elements are disposed along the first direction; along the first direction, the second reinforcing arm is connected with the third supporting part and the fourth supporting part on two adjacent second supporting parts.

12. The tab limiting sheet of claim 1, wherein the first mounting part is provided with a first side surface away from the second mounting part, and a first side surface is recessed to define a first mounting groove configured to mount the tab bodies; and/or
the second mounting part is provided with a second side surface away from the first mounting part, and a second side surface is recessed to define a second mounting groove configured to mount the tab bodies.

13. A top cover assembly, comprising a top cover and a pole post disposed on the top cover, wherein two tab bodies of a battery cell are connected with the pole post, the top cover assembly further comprises a tab limiting sheet configured to be insulated and disposed between a cell body and the two tab bodies of a battery cell, the two tab bodies are arranged at intervals along a first direction, and the tab limiting sheet further comprises:
a first mounting part and a second mounting part respectively configured to abut against the two tab bodies tightly; and
a connecting assembly, wherein the first mounting part, the connecting assembly, and the second mounting part are sequentially connected along the first direction, and the connecting assembly comprises:
an elastic element, wherein both ends of the elastic element are respectively connected with the first mounting part and the second mounting part; and
a first support element comprising a first supporting part connected with the first mounting part and a second part connected with the second mounting part;
wherein when the elastic element is in a natural state, the first supporting part and the second supporting part are spaced in the first direction, and when the elastic element is squeezed to a maximum deformation state, the first supporting part is tightly abutted against the second supporting part.

14. The top cover assembly of claim 13, wherein the connecting assembly comprises two elastic elements, and the first supporting part is located between the two elastic elements.

15. The top cover assembly of claim 14, wherein ends of the two elastic elements adjacent to the first mounting part are connected with an end of the first supporting part to form a first common end, and the first common end is connected with the first mounting part; and
ends of the two elastic elements adjacent to the second mounting part are connected with an end of the second supporting part to form a second common end, and the second common end is connected with the second mounting part.

16. The top cover assembly of claim 13, wherein the elastic element comprises a first arm body, an elastic part, and a second arm body, an end of the first arm body adjacent to the second arm body is connected with an end of the second arm body adjacent to the first arm body through the elastic part, an end of the first arm body away from the second arm body is connected with the first mounting part, and an end of the second arm body away from the first arm body is connected with the second mounting part.

17. A battery, comprising:
a battery cell comprising a cell body and two tab bodies, wherein each of the two tab bodies comprises a first connecting part, a bending part, and a second connecting part which are connected at an included angle sequentially, the first connecting part is connected with the cell body, and a spacing area is provided between the second connecting part and the cell body;
a top cover assembly comprising a tab limiting sheet configured to be insulated and disposed between the cell body and the two tab bodies of the battery cell, wherein the tab limiting sheet is disposed in the spacing area, a first mounting part and a second mounting area are tightly abutted against the bending parts of the two tab bodies respectively;
wherein the two tab bodies are arranged at intervals along a first direction, and the tab limiting sheet further comprises:

a first mounting part and a second mounting part respectively configured to abut against the two tab bodies tightly; and a connecting assembly, wherein the first mounting part, the connecting assembly, and the second mounting part are sequentially connected along the first direction, and the connecting assembly comprises:

an elastic element, wherein both ends of the elastic element are respectively connected with the first mounting part and the second mounting part; and a first support element comprising a first supporting part and a second part, wherein the first supporting part is connected with the first mounting part, and the second part is connected with the second mounting part;

wherein when the elastic element is in a natural state, the first supporting part and the second supporting part are spaced in the first direction, and when the elastic element is squeezed to a maximum deformation state, the first supporting part is tightly abutted against the second supporting part.

18. The battery of claim 17, wherein the connecting assembly comprises two elastic elements, and the first supporting part is located between the two elastic elements.

19. The battery of claim 18, wherein both ends of the two elastic elements adjacent to the first mounting part are connected with an end of the first supporting part to form a first common end, and the first common end is connected with the first mounting part; and wherein both ends of the two elastic elements adjacent to the second mounting part are connected with an end of the second supporting part to form a second common end, and the second common end is connected with the second mounting part.

20. The battery of claim 17, wherein the elastic element comprises a first arm body, an elastic part, and a second arm body, an end of the first arm body adjacent to the second arm body is connected with an end of the second arm body adjacent to the first arm body through the elastic part, an end of the first arm body away from the second arm body is connected with the first mounting part, and an end of the second arm body away from the first arm body is connected with the second mounting part.

\* \* \* \* \*